United States Patent [19]

Slobodin

[11] Patent Number: 5,084,777
[45] Date of Patent: Jan. 28, 1992

[54] LIGHT ADDRESSED LIQUID CRYSTAL LIGHT VALVE INCORPORATING ELECTRICALLY INSULATING LIGHT BLOCKING MATERIAL OF A-SIGE:H

[75] Inventor: David E. Slobodin, Los Altos, Calif.

[73] Assignee: Greyhawk Systems, Inc., Milpitas, Calif.

[21] Appl. No.: 681,148

[22] Filed: Apr. 5, 1991

Related U.S. Application Data

[63] Continuation-in-part of Ser. No. 436,400, Nov. 14, 1989, abandoned.

[51] Int. Cl.$^5$ .............................................. G02F 1/133
[52] U.S. Cl. ............................................ 359/67; 359/72
[58] Field of Search ................ 350/339 R, 342, 351, 350/331 R; 428/641, 646

[56] References Cited

U.S. PATENT DOCUMENTS

| | | | |
|---|---|---|---|
| 4,723,838 | 2/1988 | Aoki et al. | 350/336 |
| 4,799,773 | 1/1989 | Sterling | 350/342 |
| 4,868,616 | 9/1989 | Johnson et al. | 350/342 X |
| 4,941,735 | 7/1990 | Moddel et al. | 350/342 |

Primary Examiner—Stanley D. Miller
Assistant Examiner—Ron Trice
Attorney, Agent, or Firm—Flehr, Hohbach, Test, Albritton & Herbert

[57] ABSTRACT

An improved light addressed liquid crystal light valve incorporating electrically insulating light blocking material is disclosed. The light valve has a hydrogenated amorphous silicon photosensitive layer and a germanium containing or tin containing alloy film as a light blocking layer. The light blocking layer that may be used is a selected alloy which includes one or more elements from the group consisting of germanium and tin, one or more elements from the group consisting of hydrogen, nitrogen and oxygen, and zero or more elements from the group consisting of silicon and carbon. The light blocking layer has an optical density per unit thickness approximately equal to or greater than 3 OD/micron for visible light and a sheet resistivity approximately equal to or greater than $10^{10}$ ohms/square.

4 Claims, 2 Drawing Sheets

LIGHT ADDRESSED LIQUID CRYSTAL LIGHT VALVE INCORPORATING ELECTRICALLY INSULATING LIGHT BLOCKING MATERIAL OF A-SIGE:H

This application is a continuation-in-part of application Ser. No. 436,400 filed on Nov. 14, 1989 and now abandoned.

BACKGROUND OF THE INVENTION

1. Field of the Invention

The present invention relates to a liquid crystal light valve containing a photoconductor and light blocking layer. More specifically, the present invention relates to a light valve having a light blocking layer comprised of an amorphous germanium-containing or tin-containing alloy. Specifically, the light blocking layer may contain a mixture of an element from the group of germanium and tin, at least one element from the group of hydrogen, oxygen and nitrogen, and zero or more elements from the group of carbon and silicon. In the preferred embodiment, this light blocking layer contains an amorphous hydrogenated alloy of germanium and silicon.

2Summary of the Prior Art

The prior art is replete with liquid crystal light valves. These light valves are used in high resolution displays, electronic imaging and optical computing applications. With respect to the present invention, those light valves of most interest employ a photoconductor layer and operate in reflection mode. One light valve of this type is found in U.S. Pat. No. 4,019,807 for a Reflective Liquid Crystal Light Valve with Hybrid Field Effect Mode, issued Apr. 16, 1977, by Boswell et al. The device of this patent utilizes a cadmium sulfide CdS photoconductor, a cadmium telluride CdTe light blocking layer, a CdS/CdTe photoresponsive heterojunction, and a magnesium fluoride/zinc sulfide MgF/ZnS multilayer dielectric mirror.

As light valve technology has progressed, it has become apparent to those skilled in the art that hydrogenated amorphous silicon (hereinafter "a-Si:H") has significant advantages over CdS as a photosensitive layer, particularly with regard to speed of light valve operation and reproducibility. There exist in the prior art numerous publications describing light valves which utilize an a-Si:H photosensitive layer, but which have no light-blocking layer or dielectric mirror. Thus, light valves incorporating an a-Si:H photosensitive layer, a light-blocking layer, and a dielectric mirror are less common in the prior art.

U.S. Pat. No. 4,799,773 for a Liquid Crystal Light Valve, issued Jan. 24, 1989, by Sterling, describes an a-Si:H photoconductor light valve which uses CdTe as the light-blocking layer and a silicon dioxide/titanium dioxide $SiO_2/TiO_2$ multilayer dielectric mirror. In this light valve, a special multilayer intermediate bonding structure is required to bond the CdTe light blocking layer to the CdS photoconductor layer. In the absence of this extraneous layer, peeling of the light blocking layer from the photoconductor layer, and vice versa, occurred. The extraneous multilayer structure also facilitated device repeatability. A significant disadvantage of this type of light valve structure, however, is that a rather complex and lengthy fabrication is required to produce the multiple and chemically unique layers.

More specifically, in the device of the Sterling patent, the special multilayer structure is required to bond the CdTe layer to the photoconductor because CdTe does not adhere well when directly deposited on the a-Si:H photoconductor. Fabrication of the bonding structure requires four processing steps and a dedicated thin film deposition system. In addition, separate thin film deposition systems are required for photoconductor layer deposition and CdTe deposition. Moreover, deposition of the CdTe light blocking layer must be carefully controlled to maintain precise CdTe stoichiometry so that the layer has a resistivity high enough for high resolution light valve applications.

The prior art light valve has performance disadvantages. It is desirable to construct a light valve having as thin a light blocking layer as possible. As will be explained, the thinner the light blocking layer is while satisfying the optical density requirement, as well as other requirements, the better the performance of the light valve system. According to the prior art preferred embodiment of Sterling, a CdTe light blocking layer of 2 micrometers thickness is required. The present invention is a light blocking layer which is easier to deposit than CdTe and which performs the same functions with a thinner layer.

The placement of amorphous alloys of silicon and germanium, and other elements, in contact with amorphous silicon is generally known, although not for use to form a light blocking layer in a photoaddressed liquid crystal light valve. Amorphous silicon germanium alloy has been deposited on amorphous silicon in tandem solar cells as a photovoltaic layer and in electrophotographic devices as a photosensitive layer, for example. The prior art of photocells and electrophotographic devices does not address or touch on a light blocker's three essential requirements of low impedance, high optical density, and high sheet resistivity because there is no need to maintain resolution of an optical signal or block light. Furthermore, the material characteristics necessary for amorphous silicon germanium alloys which are used in light blockers are different from the material characteristics necessary in photocells and electrophotographic devices.

U.S. Pat. No. 4,723,838 for a Liquid Crystal Display Device, issued Feb. 9, 1988, by Aoki et al, describes an amorphous silicon germanium alloy layer placed adjacent to a photosensitive silicon layer for the purpose of blocking light. There are substantial reasons why Aoki et al is not applicable to the technology of spatial light modulators and/or lacks a teaching necessary for the construction of a light blocking layer usable in a spatial light modulator.

The fact that amorphous materials are usable as light blockers in TFT matrices, as in Aoki et al, does not imply that they are usable as light blockers in spatial light modulators. In the light valve, the light blocking layer must simultaneously meet the following three critical factors to satisfy operating capability: the optical density must be high (3 OD or more) to achieve good light absorption the sheet resistance must be high ($10^{10}$ ohms/square or more) to achieve high resolution, and the impedance must be low (less than that of the liquid crystal layer) so that substantially all of the voltage falls across the liquid crystal instead of the light blocking layer and to achieve a large voltage swing across the liquid crystal for a good dynamic range. In fact, the lower the impedance of the light blocking layer, the better the dynamic range that can be achieved.

In the prior art, Aoki's sheet resistivity is not a concern because the light blocking material is disposed in individual separate and distinct elements below each pixel. Charge spreading does not occur when the elements are separated, and therefore maintaining resolution by sheet resistivity and preventing charge spreading is again not addressed. In the present invention the light blocking layer is a continuous sheet across the light valve in which sheet resistivity must be kept high to maintain resolution.

In the prior art of Aoki et al, impedance is not a concern. The impedance of the light blocking layer does not need to be small because the electric field created by the pixel electrodes will not be crossing the liquid crystal material in the region where the light blocking layer is located, and therefore no reduction in dynamic range would occur. Because the impedance and sheet resistivity are not a concern, the necessary optical density of light blocking layer can be achieved by depositing an arbitrarily thick layer. In summary, there is no requirement for Aoki et al to have a thin light blocking layer.

Furthermore, the optical density required by Aoki et al is not discussed. The optical density required by Aoki et al may be less than that required by the present invention. In Aoki, the optical density is sufficient to reduce the ambient read light so as to allow proper functioning of the circuit. In the present invention, the optical density must be sufficiently high to make sure that the intense projection read light is reduced so much that the dim write light is not washed out by the read light. Thus, the optical densities required by these two applications are not necessarily the same.

A further matter not discussed in the prior art is the ratio of optical density per unit thickness. Part of the present invention is the ability to create the necessary optical density with a reduced thickness. As argued above, there is no necessity in Aoki et al to achieve a high optical density, while at the same time reducing thickness. As mentioned above, in the prior art of Sterling the thickness of the light blocking layer is described as 2 microns (column 3, line 59). Assuming that the optical density of Sterling is about the same as the present invention, because they have similar operating requirements, then Sterling has a ratio of optical density to thickness of (3–5 OD/2 microns) 1.5–2.5 OD per micron. In the present invention, the thickness of the light blocking layer is approximately 1 micron or less. Thus the ratio of optical density to thickness in the present invention is (3–5 OD/1 microns) approximately 3 OD per micron or greater.

The present invention is a light blocking layer two or more times thinner than the light valve of the prior art which achieves similar light valve gain and which is easier to deposit. Consequently, for a given level of light valve gain and given liquid crystal cell structure, the present light valve has a larger dynamic range and better resolution relative to the light valves of the prior art.

SUMMARY OF THE INVENTION

Accordingly, it is an object of the present invention to provide a light blocking layer in a photoaddressed liquid crystal light valve that is capable of direct and efficient bonding to the photosensitive layer.

It is another object of the present invention to provide a light blocking layer which is suitable for use in a liquid crystal light valve.

It is yet another object of the present invention to provide a light blocking layer made of an amorphous germanium or tin alloyed with at least on other element.

It is still another object of the present invention to provide a light blocking layer with an optical density per unit thickness of 3 OD per micron or greater.

It is another object of the present invention to provide a light blocking layer with a sheet resistivity greater than $10^{10}$ ohms/square.

The attainment of these and related objects may be achieved through use of the novel light valve herein disclosed. A light valve in accordance with this invention has an a-Si:H photosensitive layer and a germanium containing or tin containing alloy film as a light blocking layer. The light blocking layer that may be used is a selected alloy which includes one or more elements from the group consisting of germanium and tin, one or more elements from the group consisting of hydrogen, nitrogen and oxygen, and zero or more elements from the group consisting of silicon and carbon. The significant advantages of this selected alloy structure are: (1) no special bonding layer is required between the photoconductor and the light blocking layer so fabrication is simplified; and (2) the light blocking layer may be deposited using the same equipment as used to deposit the photoconductor, further simplifying light valve fabrication. In addition, the germanium or tin alloy light blocking layers can be made to have electrical and optical properties which result in light valves with gain and resolution equal to or better than the prior art. This, in turn, allows the required impedance and sheet resistivity to be achieved.

The result of the Applicant's invention is a light blocking layer composed of a particular alloy which equals or surpasses the prior art in several stringent requirements necessary for use in a photoaddressed liquid crystal light valve. These requirements include optical density, impedance, and sheet resistivity. An important part of applicant's invention is that the required optical density for a light blocking layer usable in a light valve can be achieved in a thickness less than that known in the prior art.

Applicant's invention is also, in part, the recognition that the B-value is a critical criteria that should be considered for the creation of a suitable light blocking layer for use in a liquid crystal light valve. Prior to the applicant's invention it was not realized that the competing processing requirements for B-value and for $\sigma_0$ should be deliberately controlled and optimized in order to provide the light blocking material with the desired electrical and optical properties.

The attainment of the foregoing and related objects, results, advantages and features of the invention should be more readily apparent to those skilled in the art, after review of the following more detailed description of the invention, taken together with the drawings, in which:

DETAILED DESCRIPTION OF THE INVENTION

Figure 1:
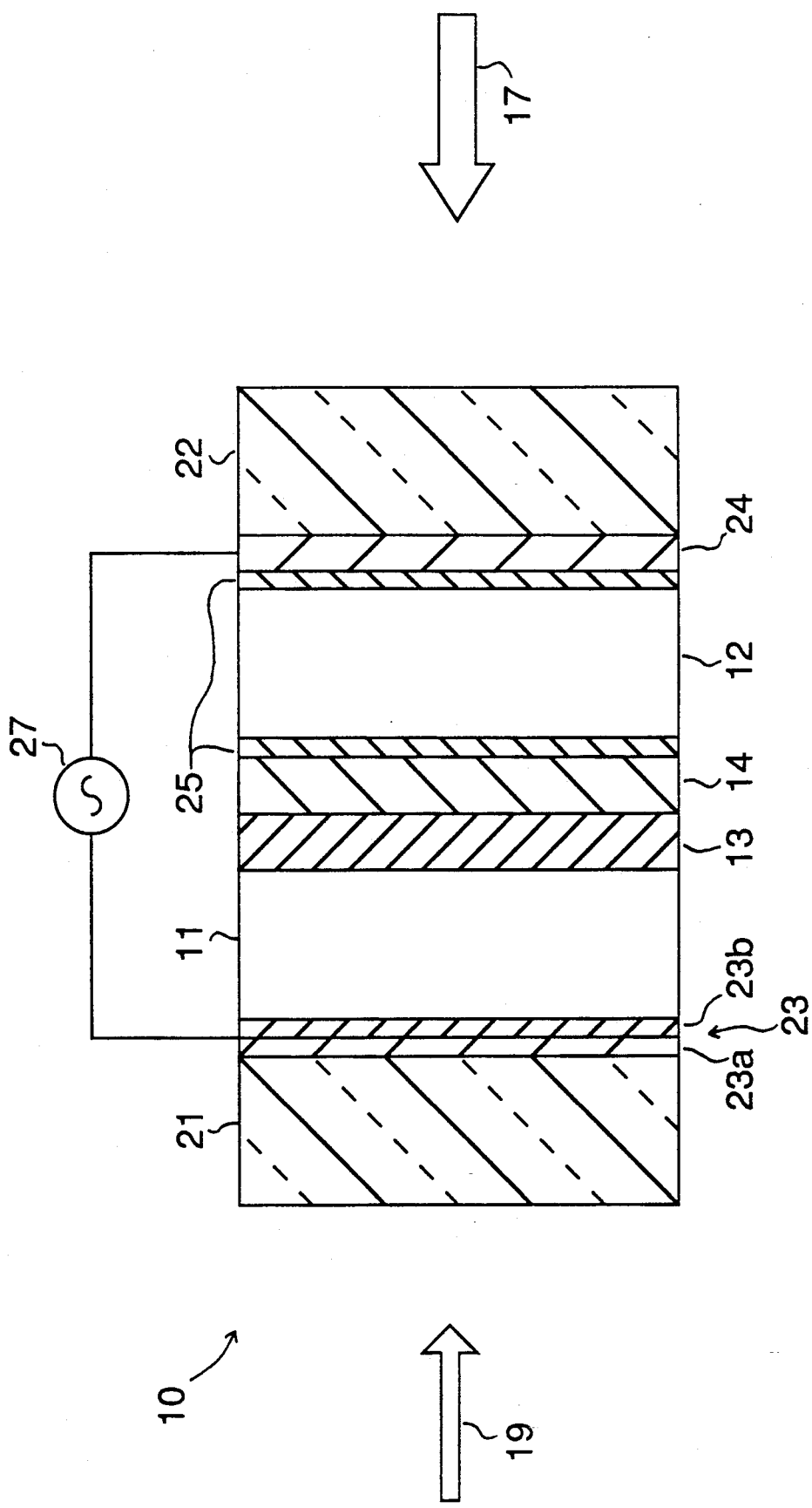
FIG. 1 is a cross sectional view of a liquid crystal light valve of the preferred embodiment.

Referring to FIG. 1, a cross sectional view of the photoaddressed liquid crystal light valve 10 of the preferred embodiment is shown. A liquid crystal material 12 is enclosed between two glass substrates 21 and 22. Transparent conducting electrodes 23 and 24 are located to the interior of the glass substrates 21 and 22. The purpose of these electrodes and the application of voltages across the light valve are well known. On electrode 23 a photoconductor layer 11 is located. A light blocking layer 14 is adjacent to the photoconducting layer 11 and adjacent to the light blocking layer 14 is a dielectric mirror 13. The remaining space, between the dielectric mirror 13 and the electrode 24 is a liquid crystal layer 12. Of course, the present invention is not limited solely to liquid crystal materials. Other electro-optic materials such as PDLC or electrochromic materials which can modulate the projection light 17 can be substituted for liquid crystal layer 12. The preferred embodiment of this device uses a liquid crystal material which can modulate polarization. Two alignment layer 25 are provided on each side of the liquid crystal 12 to induce the required molecular orientation of the liquid crystal 12.

In operation, the photoconductor 11 electrically modulates the state of the liquid crystal layer 12. A voltage is applied by voltage generator 27 across the electrodes 23 and 24 as light is impinged upon the photoconductor 11. Since the impedance of the photoconductor 11 is light sensitive, a spatially varying light pattern, such as an image, will produce a spatially varying electric field across the liquid crystal material 12, thereby creating an image in the liquid crystal (through well known methods). The dielectric mirror 13 and a light blocking layer 14 are placed between the photoconductor 11 and the liquid crystal 12, in essence to reflect projection light through the liquid crystal and to protect the photoconductor 11, respectively. The dielectric mirror 13 functions to reflect most of the projection (or read) light 17 (used in projection of the image created in the liquid crystal 12) after the projection light 17 has passed through the liquid crystal layer 12. The light blocking layer 14 prevents most of the small percentage of light that actually does pass through the dielectric mirror 13 from impinging upon the photoconductor 11. The light blocking layer 14 is significant because it blocks light that may otherwise interfere with or overwhelm the low intensity write light 19 incident on the other side of the photoconductor 11 (i.e., used to created the initial image in the liquid crystal layer 12).

In the preferred embodiment, the light blocking layer 14 is disposed as a single continuous layer directly onto the photoconductor layer 11. Of course, techniques explained in the prior art, such as the insertion of a bonding layer between the light blocking layer 14 and the photoconductor 11 could still be utilized. A thin 0.1 micron layer of silicon oxide could be placed between the light blocking layer 14 and the photoconductor layer 11. It should also be noted that the light blocking layer 14 need not be a single layer. The light blocking layer 14 can have several germanium or tin alloy layers separated by silicon oxide layers. Although in the preferred embodiment the dielectric mirror 13 is disposed directly onto the light blocking layer 13, the light blocking layer 14 could be integrated with the dielectric mirror 13 by replacing titanium oxide layers in the dielectric mirror with the germanium or tin alloy light blocking material.

Figure 2:
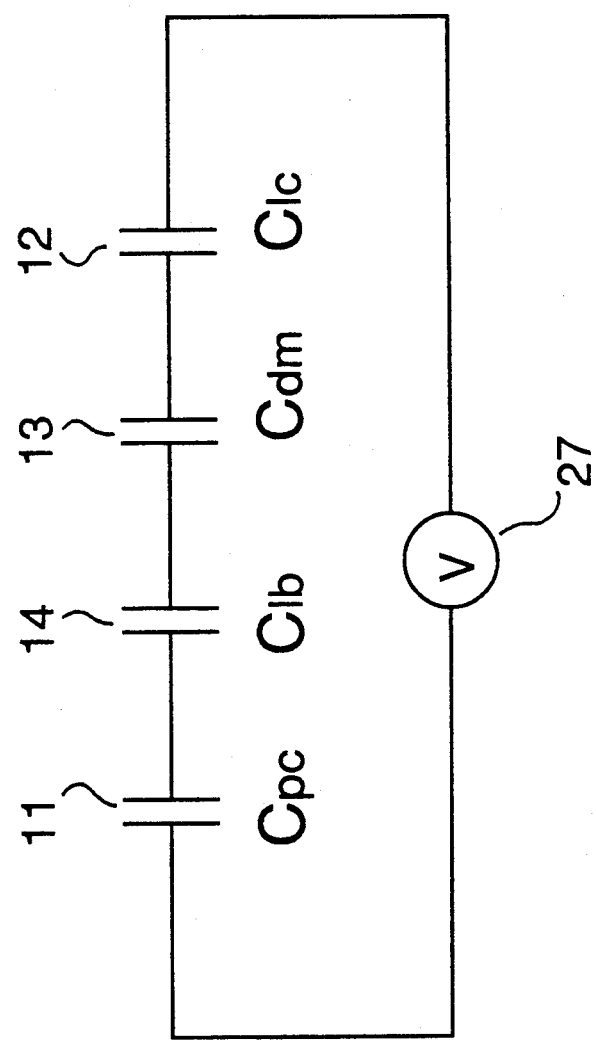
FIG. 2 is a first approximation equivalence circuit for the liquid crystal light valve of the preferred embodiment.

Referring to FIG. 2, an equivalent circuit for the liquid crystal light valve 10 of the preferred embodiment is shown. There are at least four important constraints on the light blocking layer 14. The first requirement is that the light blocking layer 14 must be of suitably small thickness. The light valve 10 to a first approximation acts like a set of capacitors in series and the photoconductor acts as a variable capacitor whose impedance decreases as illumination level is increased. An AC (e.g. square wave) voltage is applied across the light valve 10 between transparent conducting layers 23 and 24. For the light valve 10 to work effectively, two conditions must be met. First, when the light valve 10 is not exposed to light, the impedance of the photoconductor layer 11 must be greater than that of the liquid crystal 12, so that only a small voltage drop appears across the liquid crystal. Second, when the light valve 10 is exposed to light, the impedance of the photoconductor 11 must be less than that of the liquid crystal 12 so that most of the voltage appears across the liquid crystal 12.

Thus, a requirement for effective operation of the light valve 10 is that the impedance of the dielectric mirror 13 and the light blocking layer 14 must be much less than the impedance of liquid crystal material 12. If the impedance of these layers is too high, then when the photoconductor 11 is illuminated, most of the drive voltage falls across the dielectric mirror and light blocking layer instead of the liquid crystal 12. In the design of light valve 10, it is generally desirable to maximize the ratio of liquid crystal voltage of the light valve 10 from when it is illuminated to when it is dark so as to increase the dynamic range of the electric field that can be applied across the liquid crystal layer 12. Thus, it is an important design criterion to have a light blocking layer 13 with low impedance. The impedance of the light blocking layer 14 or the liquid crystal layer 12 is approximately equal to layer thickness divided by layer dielectric constant. Thus, it is desirable for the light blocking layer to be thinner than the liquid crystal layer. Typically, the dielectric constant of the light blocking layer 14 is two or three times that of the liquid crystal 12 so if, for example, the liquid crystal layer 12 in a light valve 10 is 3 micrometers thick, then a light blocking layer 14 of about 1.0 micrometer thickness is acceptable, while a thickness of 0.7 micrometers is preferable. In fact, the thinner the layer that can be utilized while still providing a sufficient light blocking capability, the better the light valve performance, and, in particular, the better the dynamic range.

The second requirement is that the layer should be very efficient in absorbing light. For example, in a light valve 10 with a designed gain (ratio of read light to write light intensity) of $10^6$ and a dielectric mirror 13 with 1% optical transmission, a light blocking layer 14 which absorbs 99.99% of incident light is required. A measure of the efficiency of light absorption of the light blocking layer is the optical density (OD) defined as $-\log(\text{transmission})$. A light blocking layer 14 might typically have an OD between 3 and 5. As will be discussed, the total optical density of a layer is proportional to the thickness of that layer. A good measure of the effectiveness of a material at blocking light is the ratio of optical density per unit thickness. For example the present invention is able to achieve a total optical density of 3 in a thickness of 1 micron, giving 3 OD/micron. In the preferred embodiment, the light blocking layer has an OD/micron of 4, and still more preferred is 5 OD/micron or more (e.g. 3.5 OD in 0.7 microns). Because the projection light is primarily visible light from a lamp to be used in a color video projector, the required optical density applies to the visible light range of wavelengths. In this context, visible light is considered to range from about 400 nm to about 650 nm.

The third requirement is the light blocking layer 14 must have a sufficiently high electrical sheet resistivity. The resolution of a light valve 10 is determined by the most conducting layer in the device (other than the transparent electrode layers). The lower the sheet resistivity of the light blocking layer, the faster the spatially varying electric field induced by the photoconductor will defocus with time and the lower the light valve resolution will be. Therefore, it is important that the light blocking layer 14 is not the most electrically conducting layer in the light valve. The following equation describes the approximate relationship between light valve resolution and light blocking layer sheet resistivity, $\rho_\square$:

$$P = (t/(C_{PC}+C_{LC})\rho_\square)^{\frac{1}{2}} \qquad (1)$$

where $C_{PC}$ and $C_{LC}$ are dependent on the photoconductor and liquid crystal layer thickness, t is the liquid crystal switching time, and P is the dimension of the light valve resolution element. Using typical values for light valves, the light blocking layer 14 should have a sheet resistance of approximately $1 \times 10^{12}$ ohms/square in order to resolve a less than 10 micron element. As a rough estimate, a sheet resistivity of $10^{11}$ ohms/square is required for resolving a 15 micron element, and a sheet resistivity of approximately $10^{10}$ will resolve a 45 micron element.

The fourth requirement is that the light blocking layer must have proper material properties. It must have low intrinsic stress and good adhesion to neighboring layers so that it does not peel or crack. It also should be electrically and chemically compatible with the photoconductor and dielectric mirror.

A fifth requirement is that the sheet resistivity and the impedance of the light blocking layer not change when light impinges it. This means that the layer should have a low photosensitivity. The standard measurement of photosensitivity is $\sigma_L/\sigma_D$, or the ratio of the conductivity of the material in light, $\sigma_L$ to dark, $\sigma_D$. A ratio $\sigma_L/\sigma_D$ of about 1 is appropriate, less than 2 is preferred, and less than 10 is essential. The sheet resistivity $\rho_{SS}$ can be kept high by maintaining the Fermi level at substantially midgap. The photoconductivity can be kept low by having a high number of recombination centers. The number of recombination centers is controlled by material composition and processing conditions.

In summary, a high performance light valve, that is, a light valve with gain in excess of 100,000 (assuming a dielectric mirror with 99% efficiency), capable of resolving less than 10 micron elements, requires a light blocking layer with optical density of greater than 3 and sheet resistivity greater than $1 \times 10^{12}$ ohms/square. A slightly lower performance light valve, also with 45 micron resolution, would have a sheet resistivity greater than $1 \times 10^{10}$ ohms/square. Furthermore, only alloys with small photosensitivity (ratio of photoconductivity to dark conductivity much less than 10) are of interest. The preferred embodiment described several methods for fabricating light blocking layers that meet these requirements.

Physical Parameters

In constructing a liquid crystal light valve 10, and more specifically, in constructing the light blocking layer 14, the following physical parameters must be considered.

The optical absorption spectrum for many amorphous semiconductors, and nearly all group IV amorphous semiconductors, in the high absorption regime are described by Tauc's equation:

$$\alpha h\nu = B(h\nu - E_{OPT})^2 \qquad (2)$$

where $\alpha$ is the optical absorption coefficient, $\nu$ is the frequency of the light photon to be absorbed, and $E_{OPT}$ is referred to as the optical gap.

The optical density of a thin film, ignoring reflection, is related to the optical absorption coefficient by the following equation:

$$OD = \alpha d \log_{10} e \qquad (3)$$

where d is the film thickness and e is the logarithmic constant. Substituting equation (3) into the Tauc expression, equation (2), and rearranging provides OD as a function of optical gap:

$$OD = \frac{B(h\nu - E_{OPT})^2}{h\nu} d\log_{10}e \qquad (4)$$

This clearly shows that the OD of any amorphous semiconductor decreases as optical gap is increased (because the photon energy $h\nu$ must be larger than the optical gap $E_{OPT}$) and OD is proportional to film thickness.

The electrical conductivity of an amorphous semiconductor is usually also related to the optical gap. Since only resistive amorphous materials of interest are for light blocking applications, and because it is desirable to avoid conduction by variable range hopping- as this leads to sheet resistivity which is too low, the concern is only for amorphous material whose conductivity is dominated by thermally activated extended state transport and whose Fermi level lies near mid-gap. Under these conditions, the electrical conductivity, $\sigma$, is related to the optical gap as follows:

$$\sigma = \sigma_0 e^{\frac{-E_{OPT}}{2kT}} \qquad (5)$$

where k is the Boltzmann constant and T is the temperature. The sheet resistivity, $\rho_\square$, of a thin film is related to the conductivity as follows:

$$\rho_\square = \frac{1}{\sigma d} \qquad (6)$$

The combination of equations (5) and (6) provides:

$$\rho_\square = \frac{1}{\sigma_0 d} e^{\frac{E_{OPT}}{2kT}} \qquad (7)$$

This equation shows that sheet resistivity increases exponentially with optical gap and it is inversely proportional to film thickness. Equations (4) and (7) show that there is a tradeoff between OD and sheet resistivity. A satisfactory amorphous light blocking layer 14 should have an optical gap and thickness such that it meets the previously stated requirements for OD and sheet resistivity.

The requirement for high optical density and high sheet resistivity put opposing requirements on the optical gap $E_{OPT}$. The optical gap is determined primarily by the material's composition, and secondarily by processing conditions. Although selection of atomic ratio of the various elements can control the optical gap, it was not clear, before the present invention, that any optical gap could satisfy the conflicting requirements for high optical density and high sheet resistivity, and therefore, the material composition to give a correct optical gap was not known. Applicant has found that material compositions resulting in an optical gap between 1.0 eV and 1.5 eV are adequate, an optical gap between 1.1 and 1.45 are preferred, and an optical gap between 1.2 and 1.4 is more preferred. If the optical gap is greater than 1.5 then the optical density is too low, whereas if the optical gap is less than 1.0, then the sheet resistivity is too low.

In order to obtain high optical density in less than 1 micron at 600 nm to 650 nm light, the standard red light in a video projector (inspection of equation 4 shows that the optical density is most difficult to achieve at long wavelengths) a large B-value and a low optical gap $E_{OPT}$ are required. The lower the B-value, the lower the optical gap must be to compensate. The needed B-value is given by equations (8a,b) below:

$$B = \frac{ODh\nu}{(h\nu - E_{OPT})^2} d\log_{10} e \quad B = \frac{1.32 \times 10^5}{(1.91 - E_{OPT})^2} \quad (8a,b)$$

Equation (8a) was derived simply from equation (4), while equation (8b) added the assumptions that the desired optical density is 3 within 1 micron thickness at a wavelength of 650 nm. Because the highest B-value typically obtained in amorphous Group IV materials is $6 \times 10^5$, the optical gap must be about 1.5 eV or less. As seen from equation (4), the higher the B-value, the better the optical density. The B-value should be greater than $2 \times 10^5$, still more preferred is for the B-value to be greater than $4 \times 10^5$. The B-value is dependent on the material network density and, to a lesser degree, structural order. A high network density results in a high B-value. In order to achieve a high network density, deposition conditions should have a high substrate temperature, low growth rate, and low ion-damage.

A further requirement is that the material have low photosensitivity and high sheet resistivity. As seen from equation (7), high sheet resistivity requires low $\rho_0$ and high optical gap $E_{OPT}$, and the higher $\rho_0$, the higher the optical gap $E_{OPT}$ must be to compensate. The necessary $\rho_0$ is given approximately, assuming that the Fermi level is at midgap as discussed previously, by equations (9a,b) below:

$$\sigma_0 = \frac{e^{\frac{E_{OPT}}{2kT}}}{\rho_\Box d} \quad \sigma_0 = 10^{-6} e^{\frac{E_{OPT}}{0.518eV}} \quad (9a,b)$$

Equation (9a) was derived simply from equation (7), while equation (9b) added the assumptions that at room temperature 2kT is approximately 0.518 eV and that the sheet resistivity goal is $10^{10}$ ohms/square for a 1 micron thick film. A $\rho_0$ less than $8 \times 10^4$ (ohm-cm)$^{-1}$ is usable, less than $8 \times 10^3$ is preferred, less than $8 \times 10^2$ is more preferred. In order to obtain both the low $\rho_0$ and the low photosensitivity, carrier mobility and carrier lifetime must be low, and the Fermi level of the material should be approximately midgap (that is the material is neither substantially p-type or n-type). If care is taken to exclude dopant type impurities during material preparation, the midgap Fermi level can be achieved. The carrier mobility is related to the material network density. A low network density results in a low carrier mobility. A low substrate temperature, high growth rate, and higher ion-damage are the proper conditions for the low network density.

As described in the previous two paragraphs, the requirement for low carrier mobility, which needs low network density, is in direct competition with the requirement for a high B-value, which needs high network density. It was not clear, before the present invention, that these conflicting requirements for a high performance light valve could be achieved simultaneously.

The following table indicates the required physical properties of amorphous group IV semiconductors in the prior art and for the present invention:

|  | Solar Cell | Electro-photography | TFT (Aoki) | Light Valve |
| --- | --- | --- | --- | --- |
| B-value | high | high | n/a | high |
| $\sigma_0$ | high | low | low | low |
| $\sigma_L/\sigma_D$ | high | high | low | low |

The light valve must achieve the requirements of simultaneous high B, low $\rho_0$, and low $\rho_L/\rho_D$. Other prior art deposition processes have not needed to meet these requirements simultaneously. Because the intended characteristics are different for the light valve application compared to other applications, the essential processing conditions to achieve the light blocking layer are not taught from the other applications.

To achieve both a B high enough for and a $\rho_0$ low enough for the present invention, one must carefully balance the competing requirements on the processing steps and material composition described above. The inventive method by which this is achieved is now described.

The high B-value and low $\rho_0$ in an amorphous material is related to the amount of disorder in the structure. To achieve both a B-value high enough and a $\rho_0$ low enough for the present invention, very specific and limited material composition and processing conditions must be imposed. The proper growth conditions can be discovered. They are highly sensitive to the method and system of deposition, as well as the deposition parameters of gas mixture, substrate temperature, glow discharge power and such. The parameters may be very different for each particular material composition. Applicant has discovered that, within the known ranges for any particular composition and deposition system, the parameters may be qualitatively described as slow deposition rates, low ion damage, and low temperature substrates. Applicant has further discovered that the primary parameters to fine tune the material characteristics are the substrate temperature and deposition rate.

First, a material is selected to meet the optical gap and other requirements. The material composition which gives the desired amorphous light blocking layer must include a semi-metal component (germanium or tin) for the required low optical gap and a terminator (hydrogen, nitrogen, or oxygen, and possibly fluorine or chlorine) to yield material dominated by extended state transport. The composition may also include a semi-insulator component (silicon or carbon). The basic optical gap must be established with the semi-metal component, because the optical gaps of the semi-insulator components are too high. In order to make the light blocking layer be dominated by extended state transport and have a Fermi level near midgap, a terminator is added. In addition, because the competing requirements of B-value and $\rho_0$ on the network density must be balanced, the addition of the terminator to adjust this network density is essential to the proper functioning of the light blocking layer. In the embodiment using a germanium semi-metal component, hydrogen is the preferred terminator, and it should have an atomic fraction in the alloy between 0.2 and 0.6 if no semi-insulator components are present, and an atomic fraction between 0.05 and 0.3 if a semi-insulator component is present. If other terminators such as nitrogen or oxygen are used, they should be present with an atomic fraction between 0.03 and 0.3. Addition of the terminator will also increase the optical gap of the material. If the optical gap must still be increased, then the semi-insulator can be added. Applicants have found that the ratio of the semi-insulator to the total amount of group IV elements must be less than 0.35 if the semi-metal is germanium, and less than 0.90 if the semi-metal is tin. Of course, traces of other elements might be included in the above mixture without altering its basic nature. Specifically, small amounts of various dopants, phosphorous or boron, for example, might be added to the light blocking layer to shift the Fermi level closer to midgap.

Some additional factors that should be considered are as follows. First, if all four of the group IV elements are present, excess disorder may occur. Second, tin may require the presence of a semi-insulator component to ensure that 4-fold bonding takes place so that the tin acts in the same chemical manner as the other group IV elements.

The second step is to maximize the B-value by setting the deposition rate. One starts with high enough temperature and low enough deposition rate of the light blocking layer to obtain a material with a maximized network density. Applicant has found that low deposition rates, in the range of 1 to 4 Å per second, are preferred in order to achieve a high network density at normally used substrate temperature less than 450° for plasma deposition conditions. This yields a layer with a maximized B-value and a $\rho_0$ that is often higher than desired.

The third step is to reduce $\rho_0$ by reducing the substrate temperature until the resistivity requirement is met. The substrate temperature is lowered to reduce the network density enough to lower $\rho_0$ without significantly reducing the B-value. Applicant has discovered that as temperature is lowered, reduction of $\rho_0$ occurs before the reduction of B-value. Applicant has found that substrate temperatures somewhere between 100° and 250° typically provide a low $\rho_0$ while maintaining a high B-value.

The final step is to adjust the material composition slightly, if required. If the resistivity is too low, the optical gap is increased, it the optical density is to high, the optical gap is decreased. If the network density needs to be changed, the amount of terminator may be adjusted.

The likely course of action which is known in the prior art in order to increase the optical density would be to decrease the optical gap $E_{OPT}$. Examination of Equation 7 shows that this course of action would result in an decreased sheet resistivity. In a TFT application such as Aoki et al, the decrease in sheet resistivity is not a problem because the light blocking areas are not continuous sheets, as discussed above, whereas in the present invention the increased sheet resistivity is a problem. It is the applicant's invention to achieve a high B-value while maintaining a low conductivity $\rho_0$ in order to obtain high optical density with a lower thickness while maintaining high sheet resistivity.

Although Aoki et al mentions an optical gap $E_{OPT}$, the only requirement for the optical gap is that it be less than that of the adjacent semiconductor. Aoki et al is deficient in that it does not teach, suggest, or recognize the importance of control of the B-value or any associated parameter. Even though Aoki et al teaches the use of an amorphous silicon germanium alloy to block light, by utilizing the teachings of Aoki et al, one would not have constructed a light blocking layer with all of the critical factors recited above, and particularly the required high optical density and low thickness. Aoki et al does not teach that $E_{OPT}$ can be specifically selected so as to simultaneously maximize both the optical density and sheet resistivity, nor does Aoki et al teach the importance of controlling the network density. Furthermore Aoki et al teaches a material in which the ratio of germanium (semi-metal) to total group IV material is 0.2. Such a composition does not provide a suitable light blocking layer for the light valve application, in which the germanium must be at least 0.35, and more preferably approximately 0.5.

Procedure for Fabrication

The procedure for fabricating the preferred light valve 10 is as follows. The glass substrate 21 is cleaned and then coated with 500 Å of tin doped indium oxide (ITO) followed by 500 Å of fluorine doped tin oxide using electron beam evaporation. The layer of tin oxide 23b prevents indium from diffusing from the ITO 22a into the amorphous photoconductor 11 during photoconductor deposition. Indium diffusion into the photoconductor has deleterious effects on light valve 10 performance. The resultant transparent coating has a sheet resistivity of approximately 50 ohms/square. Following this step, the substrate is coated with hydrogenated amorphous silicon photoconductor which may include doped and/or alloyed layers.

In a preferred embodiment, the a-Si:H with high photosensitivity sensitivity is deposited to thickness ranging from 1 to 20 microns by plasma enhanced chemical vapor deposition (PECVD) using silane, for example, as a source gas. The conditions required to deposit highly photosensitive a-Si:H using silane PECVD are well known.

Immediately following this step, and without removing the substrate from the PECVD system, the germanium alloy light-blocking layer is deposited to thickness of 0.1 to 1.0 microns. A thickness of approximately 0.7 microns is preferred. In one embodiment, this is accomplished by using germane in combination with silane as a source gas during PECVD. The resulting layer is a hydrogenated amorphous silicon germanium alloy layer.

The PECVD processing conditions sufficient to produce the light blocking layer are as follows: germane to silane gas flow ratio of 1:1, substrate temperature 200° C and RF power at 40 mW/cm². The discharge is run for 30 minutes to produce a film thickness of 0.65±0.07 micrometers. The resulting alloy has an optical gap as determined by the well known Tauc method of approximately 1.28 eV. This layer has electrical and optical properties required for high performance liquid crystal light valves 10, including a gain (with a dielectric mirror of 99% efficiency) greater than 100,000; an OD of 3 at 630 nm, 4.4 and 550 nm, and greater than 5 at 450 nm; and a sheet resistivity of $8 \times 10^{11}$ ohms/square. Furthermore, there is excellent adhesion between the light blocking layer and the a-Si:H so no special bonding layer is required.

The light blocking layer 14 of this embodiment could also be deposited using germane by itself as a source gas under the following conditions: RF power of 40 mW/cm², 120° C. substrate temperature, and gas flow of 40 sccm. This would yield a hydrogenated amorphous germanium film with an optical gap of approximately 1.3 eV.

The light blocking layer 14 may also be deposited using germane or tetramethyltin in combination with one or more of the following gases: methane, oxygen, or ammonia, to yield a film with an optical gap of 1.3 eV and the required properties. Plasma conditions would be derived using the above described method.

Following the creation of the light blocking layer 14, the dielectric mirror 13 is deposited. The dielectric mirror 13 may be made from any multilayer stack of alternating high and low refractive index material layers. Silicon oxide and titanium oxide are often used for these alternating layers. The structure and fabrication of these dielectric mirrors is known in the art.

In the final processing step, alignment layers are applied and the light valve 10 is assembled and filled with liquid crystal 12 using procedures established in the prior art of liquid crystal cell fabrication.

In an alternative embodiment, the photosensitive a-Si:H is deposited by means of reactive sputtering of a silicon target with an argon/hydrogen sputtering atmosphere conditions that are well known to those skilled in the art. The light blocking layer 13 is deposited by reactive sputtering of a germanium target using argon/nitrogen as the sputtering atmosphere. A light blocking layer with satisfactory properties is obtained using the following conditions: 2 inch diameter target, pressure=5 mTorr, 500 W RF power, 100 degrees C. substrate temperature, 9% nitrogen in argon sputtering gas and 40 sccm total gas flow, and one hour duration. The resulting film has a thickness of 0.6±0.1 microns, an optical gap of approximately 1.12 eV, an optical density of 2.1 at 630 nm, 3.5 at 550 nm and 4.0 at 450 nm; and a sheet resistivity of $1.3 \times 10^{10}$. These properties are satisfactory for a light valve with a gain of greater than 1000 and a resolution of 10 line pairs/mm.

Deposition of the photoconductor and the light blocking layer 13 are preferably carried out in a single sputtering system with multiple targets so that both layers can be deposited without removal of the substrate. Usable light blocking layers could also be fabricated by reactive sputtering of a germanium or tin target using argon in combination with one or more of the following gases as the sputtering atmosphere: oxygen, hydrogen, methane or silane.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Specifically, the possibility of adding small amounts of various dopants, phosphorous or boron, for example, to the light blocking layer to shift the Fermi level closer to midgap, is intended to falling within the scope of the claims. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a multilayer spatial light modulator device, the structure comprising:

a substrate;

a transparent conductor layer;

an amorphous photoconducting layer; and an amorphous light blocking layer containing an alloy which includes germanium, hydrogen and silicon combined as an amorphous hydrogenated silicon/germanium alloy having a Ge/(Ge+Si) atomic ratio between 0.35 and 1.0, said light blocking layer further having an optical density per unit thickness approximately equal to or greater than 3 OD/micron for visible light and a sheet resistivity approximately equal to or greater than $10^{10}$ ohms/square 2. The light valve device of claim 1 wherein said photoconducting layer is hydrogenated amorphous silicon.

3. In a spatial light modulator apparatus for reflection mode modulation of projection light, said apparatus including photoconductor means having a photosensitive impedance, electro-optic means for modulating said projection light, and light blocking means for shielding said photoconductor means from said projection light disposed between said photoconductor means and said electro-optic means, the improvement comprising:

said light blocking means including at least one continuous sheet formed from an alloy which includes germanium, hydrogen and silicon combined as an amorphous hydrogenated silicon/germanium alloy having a Ge/(Ge+Si) atomic ratio between 0.35 and 1.0 such that said sheet has an optical density per unit thickness approximately equal to or greater than 3 per micron for visible light, and a sheet resistivity approximately equal to or greater than $10^{10}$ ohms/square.

4. In a spatial light modulator apparatus for reflection mode modulation of projection light, said apparatus including photoconductor means having a photosensitive impedance, electro-optic means for modulating said projection light, and light blocking means located between said photoconductor means and said electro-optic means for shielding said photoconductor means from said projection light, the improvement comprising:

said light blocking means including at least one continuous sheet, said sheet being formed from an alloy which includes germanium, hydrogen and silicon combined as an amorphous hydrogenated silicon/germanium alloy having a Ge/(Ge+Si) atomic ratio between 0.35 and 1.0 so as to ensure an optical gap $E_{OPT}$ between approximately 1.0 eV and 1.5 eV, and said sheet being deposited under selected conditions such that the Fermi level is substantially at midgap, and the B-value and $\rho_0$ fulfill the following equations:

$$B \geq \frac{1.32 \cdot 10^5}{(1.9\,eV - E_{OPT})^2} \quad \sigma_0 \leq 10^{-6}\, e^{\frac{E_{OPT}}{0.518\,eV}}$$

greater than 3 OD/micron for visible light, and a sheet resistivity approximately equal to or greater than $10^{10}$ ohms/square.

* * * * *